United States Patent [19]

Hastings

[11] 4,385,235
[45] May 24, 1983

[54] METHOD AND APPARATUS FOR MEASURING THE THERMAL NEUTRON ABSORPTION RATE IN EARTH FORMATIONS

[75] Inventor: Mark W. Hastings, Maplewood, Minn.

[73] Assignee: Dresser Industries, Inc., Dallas, Tex.

[21] Appl. No.: 207,552

[22] Filed: Nov. 17, 1980

[51] Int. Cl.³ .............................................. G01V 5/00
[52] U.S. Cl. ..................................... 250/262; 250/270
[58] Field of Search ............... 250/253, 256, 262, 269, 250/270, 267

[56] References Cited

U.S. PATENT DOCUMENTS

| | | | |
|---|---|---|---|
| 3,133,195 | 5/1964 | Jones et al. | 250/262 |
| 3,435,216 | 3/1969 | Givens | 250/262 |
| 3,609,366 | 9/1971 | Schwartz | 250/262 |
| 4,046,764 | 9/1977 | Marquis | 250/262 |

Primary Examiner—Alfred E. Smith
Assistant Examiner—Janice A. Howell
Attorney, Agent, or Firm—Richard M. Byron; Patrick H. McCollum

[57] ABSTRACT

Circuitry is provided for establishing the points in time at which radiation is detected following neutron bursts in pulsed neutron logging. Means are provided to generate a signal indicative of the average time measurement of a predetermined number of detected pulses within a detection gate interval. A first counter circuit establishes a time position for each detected pulse within the detection interval. The time measurement signal is loaded into a down counter which transfers the individual time to a third accumulator circuit where the times signals for a predetermined number of detected pulses are compiled. The total time signal is averaged by dividing the accumulated value by the predetermined number of processed pulses. The resultant value is used to establish the macroscopic thermal neutron capture cross-section of the formation.

11 Claims, 5 Drawing Figures

METHOD AND APPARATUS FOR MEASURING THE THERMAL NEUTRON ABSORPTION RATE IN EARTH FORMATIONS

BACKGROUND OF THE INVENTION

This invention relates, in general, to radioactivity well logging, and more particularly to methods and apparatus for determining the macroscopic thermal neutron capture cross-section of the formations surrounding a borehole as determined by radiation measurements.

It is known in the art of radioactivity well logging, for example, as illustrated and described in U.S. Pat. No. 4,046,764 issued to Gerald L. Marquis, which is assigned to the assignee of the present invention, to establish the points in time of which radiation is detected within a time interval beginning at a fixed time following each neutron burst from a neutron source. A unique solution is obtained where each measured value of the time relationship of the detected pulses defines a single value of macroscopic neutron absorption cross-section (Sigma ($\Sigma$)). In the prior art, the points in time of the detected radiation pulses are determined by using a plurality of pulse registers and a corresponding number of gate circuits. This technique requires unduly complex processings for the calculation of the measured value of the time relationship and the conversion of that value to the macroscopic neutron absorption cross-section. Further, should more detected pulses be present within a given measure interval than the number of pulse registers or gate circuits available these additional pulses will not be processed. Additionally, should one of the plurality of pulse registers or plurality of gate circuits become inoperative, there is no apparent indicator of the failure of the circuitry, resulting in an erroneous Sigma calculation.

Accordingly, the present invention overcomes the deficiencies of the prior art by providing circuitry for establishing the exact points in time of which a preselected number of radiation pulses are detected within measurement intervals following neutron bursts from a neutron source and obtaining from these points in time a signal indicative of the mean time to be used for determining the macroscopic thermal neutron capture cross-section of the formation surrounding the borehole.

SUMMARY OF THE INVENTION

Circuitry is provided for establishing the points in time at which radiation is detected following neutron bursts in pulsed neutron logging. A first counter circuit establishes the points related to time at which each radiation pulse is detected within a measurement gate interval. The time measurement signal for each pulse is loaded into a down counter which counts down from the loaded in value to zero, transferring the individual time to a third counter circuit which accumulates the total time signals for a predetermined number of detected radiation pulses. The accumulated total time in the third counter circuit is transferred to an 8-bit latch circuit. The resultant output is then used to establish the macroscopic thermal neutron capture cross-section of the formation of interest surrounding the borehole.

Accordingly, it is a feature of the present invention to provide new and improved methods and apparatus for determining the macroscopic thermal neutron cross-section of formations surrounding earth boreholes;

it is also a feature of the present invention to provide a new and improved method and apparatus for determining the precise place and time of pulses indicative of detected radiation following bursts of fast neutrons in proximity to earth formations surrounding boreholes;

it is yet another feature of the invention to provide a new an improved method and apparatus for determining the arithmetic mean time of a plurality of pulses indicative of detected radiation following a burst of fast neutrons;

it is still another feature of the present invention to provide new and improved method and apparatus for determining the macroscopic thermal neutron cross-section of formations surrounding earth boreholes by determining the place and time of thirty-two pulses indicative of detected radiation following bursts of fast neutrons in or near a medium.

DETAILED DESCRIPTION OF THE DRAWINGS

Figure 1:
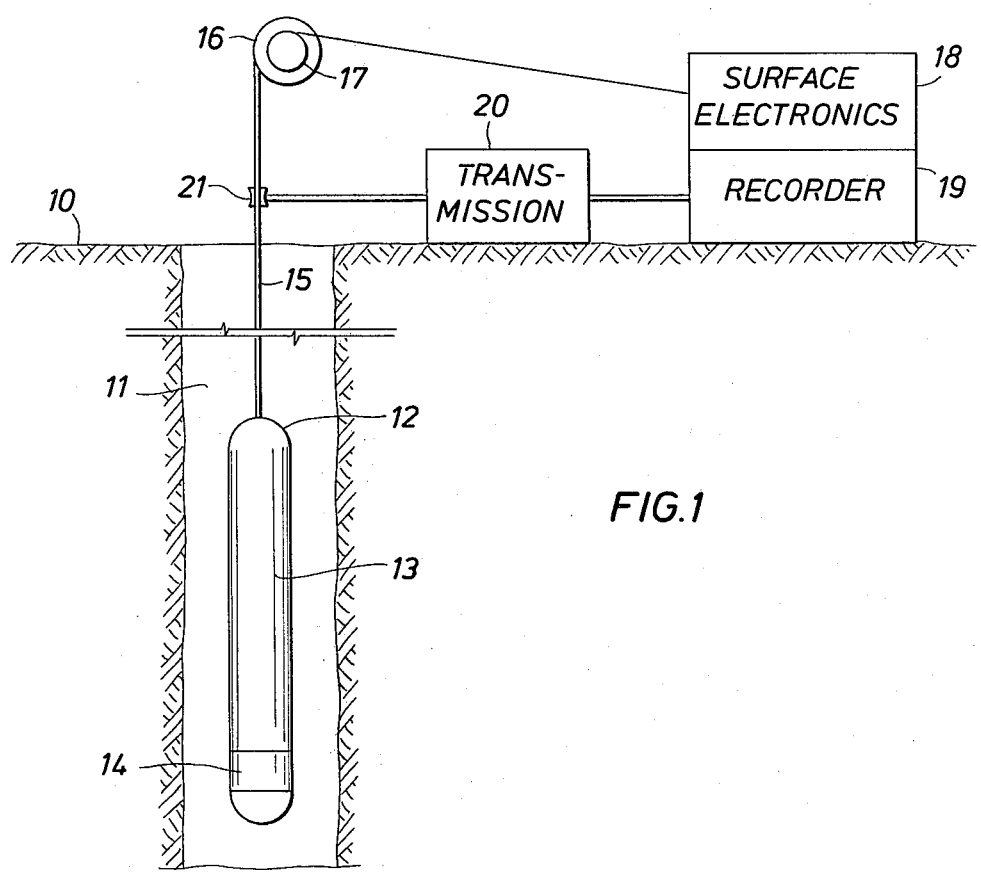
FIG. 1 is a side elevational view, partly in cross-section, of a radioactivity logging system in accordance with the present invention.

Referring now to the drawings in detail, particularly to FIG. 1, there is illustrated schematically a radioactivity well surveying operation in which a portion of the earth's surface 10 is shown in vertical section. An earth borehole 11 penetrates the earth's surface and may or may not be cased. Disposed within the well is subsurface instrument 12 of the well logging system. Subsurface instrument 12 comprises a detecting system 13 and a pulsed neutron source 14 for irradiating the formation with high energy neutrons. Cable 15 suspends the instrument 12 in the well and contains the required conductors for electrically connecting the instrument with the surface apparatus. The cable is wound on or unwound from drum 16 in raising and lowering the instrument 12 to traverse the well.

In making a radioactivity log of a well, instrument 12 is caused to traverse the well. Thereby neutrons from source 14 pulsedly irradiate the formations surrounding the borehole, and radiations influenced by the formations are detected by the detecting system 13. The resultant signal is sent to the surface through conductors within cable 15. Through slip rings and brushes 17 on the end of drum 16, the signals are coupled into surface electronics 18. After processing by the circuitry hereinafter described and illustrated, the resulting information is recorded on recorder 19. Recorder 19 is driven through transmission 20 by a measuring reel 21 over which cable 15 is drawn so that recorder 19 moves in correlation with the depth as instrument 12 traverses the well. The elements are shown diagrammatically, and it is understood that the associated circuits and power supplies are provided in a conventional manner. It is also understood that the housing for instrument 12 is constructed to withstand the pressures and mechanical and thermal abuses encountered in logging a deep well and to provide adequate space within it to house the necessary apparatus and to permit the transmission of radiation therethrough.

In the operation of the apparatus of FIG. 1, the source 14 is periodically activated, for example, approximately every eleven hundred microseconds, causing the formation to be irradiated with high energy neutrons. Gamma rays are detected by the detector system 13 which are indicative of thermal neutron source burst. The number of gamma rays present at any time is proportional to the thermal neutron population around the instrument 12. The decay rate of the neutron population is an exponential function. Electrical signals are transmitted up cable 15 indicative of such detected gamma radiation.

Figure 2:
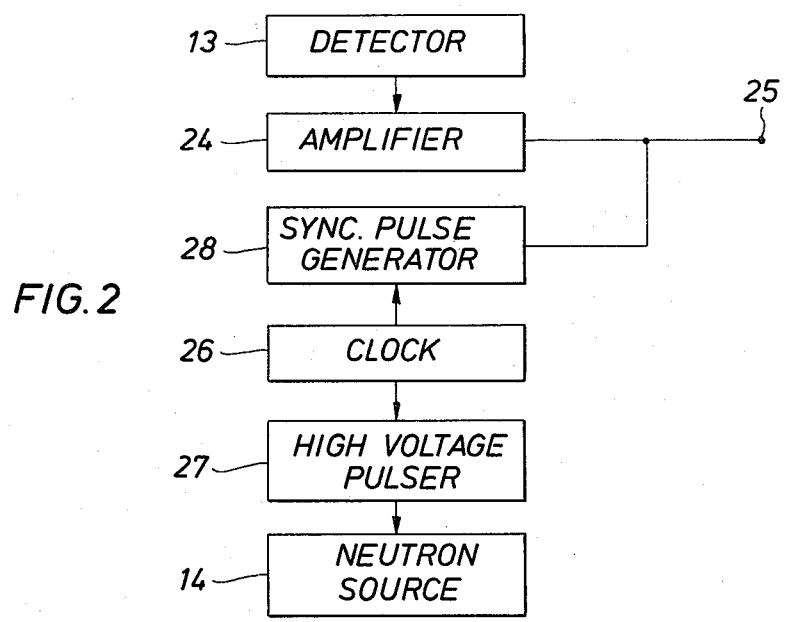
FIG. 2 is a block diagram of the subsurface electronics used in accordance with the present invention.

Referring now to FIG. 2, there is illustrated the subsurface circuitry for generating the sync signals and signal pulses hereinafter illustrated and described. The detector 13 is coupled to an amplifier 24, whose output is connected to junction 25. A clock circuit 26 has its output connected to a high voltage pulser 27 which drives a conventional neutron source 14. In the preferred embodiment of the present invention, source 14 is a conventional D-T accelerator producing high energy 14 Mev neutrons at a rate determined by clock 26. The discrete burst of neutrons occur 1100 microseconds duration. Clock circuit 26 also drives a sync pulse generator 28 having its output connected to junction 25. The junction 25 is connected to a conductor of cable 15 and serves to carry the signals to surface electronics 18 for processing.

In the operation of the circuitry and apparatus illustrated in FIG. 2, the clock 26 causes high voltage to be applied to neutron source 14 to generate discrete bursts of neutrons, each such burst being separated by approximately 1100 microseconds. The detector 13 detects gamma radiation resulting from the capture of thermal neutrons occasioned in the formation surrounding the borehole caused by neutron source 14. The detected pulses from detector 13 are immediately amplified by amplifier 24 and combined with the sync pulses, generated by sync pulse generator 28 in response to clock 26, for transmission to the earth's surface.

Figure 3:
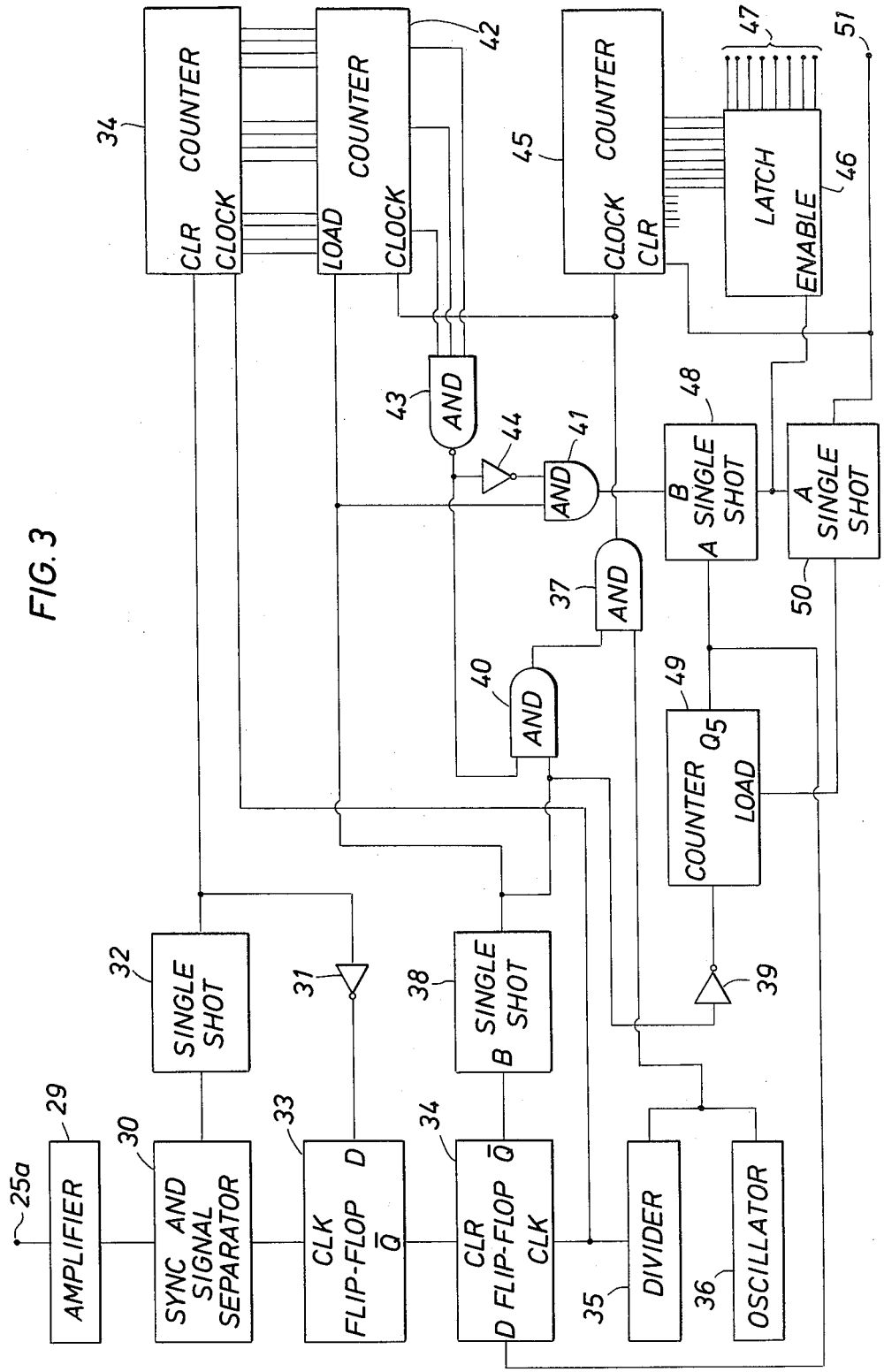
FIG. 3 is a block diagram of a portion of the surface electronics used in accordance with the present invention.

Referring now to FIG. 3, a portion of the surface electronics shown generally by the reference numeral 18 in FIG. 1 is shown in greater detail. The junction 25a corresponds to the junction 25 in the subsurface circuitry. Junction 25a is coupled through an amplifier 29 to a conventional sync and signal separator circuit 30 which separates the sync signal from the amplified signal pulses. The separation can be achieved by any of the conventional circuit devices, for example, through pulse height discrimination. The sync output of the separator circuit 30 which separates the sync signal from the amplified signal pulses. The separation can be achieved by any of the conventional circuit devices, for example, through pulse height discrimination. The sync output of the separator circuit 30 is coupled into the input of single shot multivibrator circuit 32, the output of which is coupled to the clear input of counter circuit 34 and simultaneously to the D input of flip-flop circuit 33 through inverter circuit 31.

The signal output of separator circuit 30, which represents the detected radioactivity pulses from the subsurface detector, is coupled into the clock input of flip-flop circuit 33. The $\overline{Q}$ output of flip-flop circuit 33 is connected to the clear input of flip-flop circuit 34. The clock input of flip-flop circuit 34 is connected to the output of divider circuit 35, which also connects to the clock input of counter circuit 34. The input of divider circuit 35 is connected to the output of oscillator circuit 36 which is also connected to one input of two-input AND gate 37.

The $\overline{Q}$ output of flip-flop circuit 34 is connected to the input of single shot multivibrator 38, the output of which connects to the input of inverter circuit 39, one input of two-input AND gate 40, one input of two input AND gate 41 and the load input of counter circuit 42. The parallel inputs of counter circuit 42 are provided by the corresponding parallel outputs of counter circuit 34. The parallel outputs of counter circuit 42 connects to the inputs of three input AND gate 43. The output of AND gate 43 provides the second input for AND gate 40 and the input for inverter circuit 44. The output of AND gate 40 connects to the second input of AND gate 37 the output of which connects to the clock input of counter circuit 45 and the clock input of counter circuit 42. The outputs of counter circuit 45 connects to the inputs of latch circuit 46, the outputs of which is represented by junction 47.

The output of inverter circuit 44 provides the second input to AND gate 41 of which the output is connected to the B input of single shot multivibrator 48. The A input of single shot multivibrator 48 is provided by the Q5 output of binary counter circuit 49, the input of which is connected to the output of inverter circuit 39. The output of counter circuit 49 is also connected to the D input of flip-flop circuit 34. Single shot multivibrator 48 has the output connected to the input of single shot multivibrator 50 and to the enable input of latch circuit 46. One output of single shot multivibrator 50 connects to the load input of counter circuit 49. The second output of single shot multivibrator 50 connects to junction 51 and to the clear input of counter circuit 45.

In the operation of the circuit of FIG. 3, it should be appreciated that the input signal appearing at junction 25a consists of a trigger or sync pulse followed by the signal pulses of interest, for example, as illustrated in FIGS. 4A and 4C, wherein four signal pulses are illustrated following the sync pulse at time zero. The trigger pulse is synchronized with the neutron burst from the subsurface instrument source. The signal pulses are random but on the average decrease in number exponentially with time. The number of signal pulses is a function of instrument efficiency and wellbore environment.

The sync signal and the detected radiation pulses are provided by the subsurface instrument 12 to sync and signal separator circuit 30 after amplification by amplifier 29. The sync output of the separator circuit 30 is coupled to single shot multivibrator 32 and the signal output representative of the detected radiations is connected to the clock input of flip-flop circuit 33. One output of single shot multivibrator 32 connects to the input of inverter circuit 31 which inverts the sync pulse supplying the output pulse to the D input of flip-flop circuit 33. Single shot multivibrator 32 triggers on the input sync pulse producing an output gate signal, which in the preferred embodiment is a square wave 600 microseconds in duration, beginning 400 microseconds after the sync pulse, as shown in FIG. 4B. This gate signal, also the input to counter circuit 34 which enables the counter to begin counting at a 1 megahertz rate, illustrated by the 1 MHz signal of FIG. 4D falling within the gate interval of FIG. 4B.

As stated above, the pulse present at the output of inverter circuit 31 provides one input to flip-flop circuit 33. The other input to flip-flop circuit 33 is the series of detected pulses present at the output of sync and signal separator 30, shown in FIG. 4C. When both the detected pulses and the gate interval are simultaneously present on the inputs of flip-flop circuit 33 the $\overline{Q}$ output will shift from a high state to a low state. This output is provided to the clear input of flip-flop circuit 34. The clock input of flip-flop circuit 34. The clock input of flip-flop circuit 34 is a 1 megahertz signal provided by divider circuit 35, which divides the 16 megahertz oscillator circuit 36 output signal by a factor of sixteen. The 1 megahertz signal also is connected to the clock input of counter circuit 34, allowing counter circuit 34 to count at a 1 megahertz rate during the enable interval.

The input signal provided to flip-flop circuit 34 causes the $\overline{Q}$ output to shift from high to low. The shift in output of flip-flop 34 triggers single-shot multivibrator 38 which outputs a pulse of relatively short duration, in the preferred embodiment 250 nanoseconds. This output pulse is coupled to counter circuit 49 by way of inverter circuit 39. Binary counter 49 is designed to count up to a predetermined number of detected pulses. As will be explained further hereinafter, in the preferred embodiment counter 49 will be reset when a total of thirty-two pulses are detected. The output pulse of single shot multivibrator 38 is also coupled to load input of counter circuit 42 causing the signal present in counter circuit 34 at the time a radiation pulse is detected to be loaded into counter circuit 42 along the parallel output-input lines.

Figure 4:
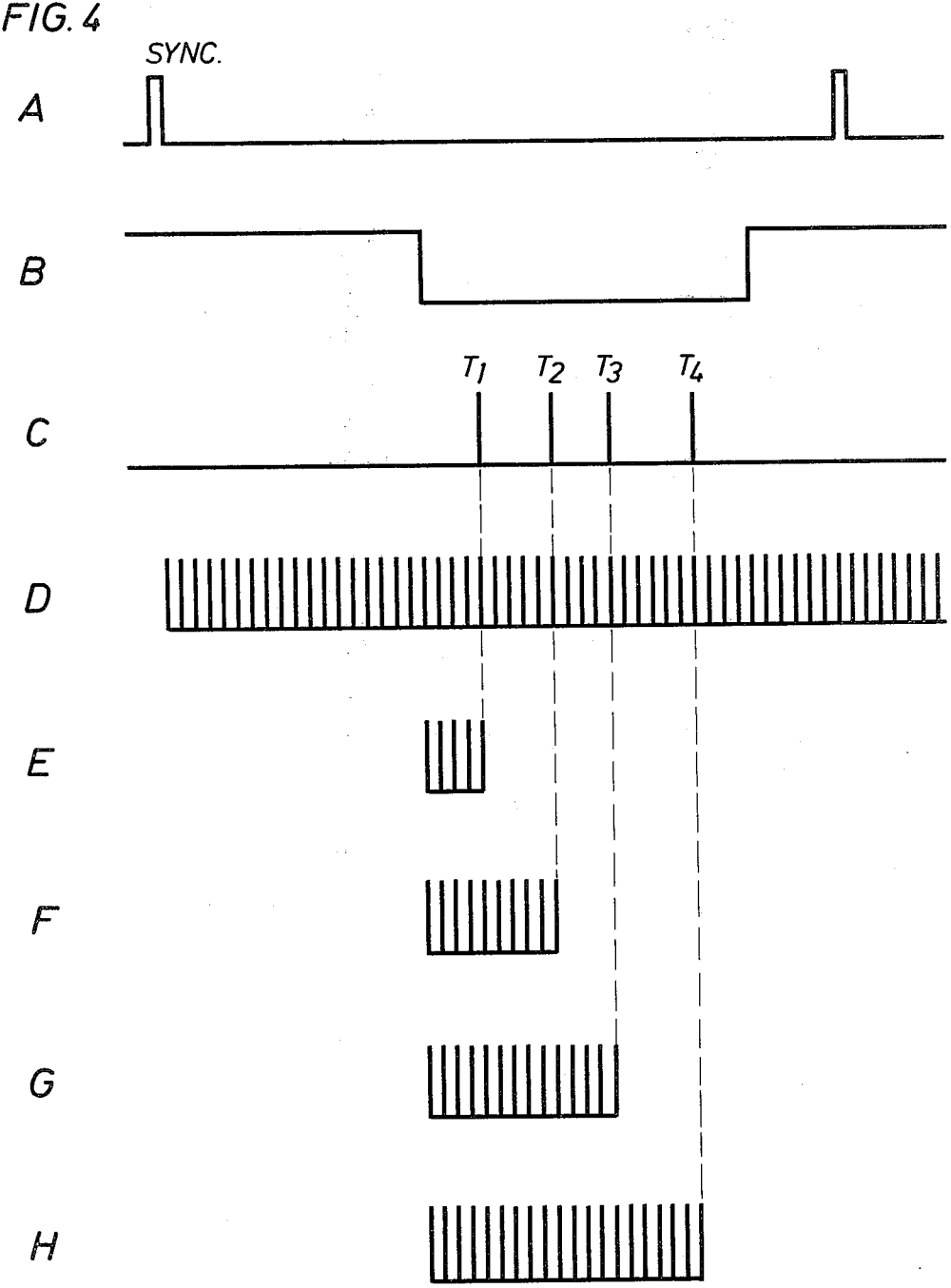
FIGS. 4 A–H represents representative timing diagrams of the circuitry in accordance with FIG. 3.

The operation of counter circuit 34 can be better understood by reference to the composite FIG. 4. The square wave output of single shot multivibrator circuit 32, FIG. 4B, enables counter circuit 34 causing it to count at a 1 megahertz rate for the duration of the gating interval. When the first radiation pulse is detected within the gate interval, represented by $T_1$ of FIG. 4C, counter circuit 42 receives a load signal from single shot multivibrator circuit 38. This load signal causes the count signal then present in counter circuit 34 to be loaded into counter circuit 42. In the case of the detected pulse represented by $T_1$ the signal shown at FIG. 4C is loaded into counter circuit 42. Counter circuit 42 will then proceed to count down from the value loaded in toward zero at a 16 megahertz rate. This process continues for all the detected pulses within the gate intervals, illustrated by FIGS. 4F–4H.

When a signal is loaded into counter circuit 42 the parallel outputs of counter circuit 42 will be caused to shift from a high state, the condition when no signal is present in counter circuit 42, to a low state. This causes the output of three input AND gate 43 to shift high. The output of AND gate 43 remains high until the parallel outputs of counter circuit 42 return to a zero value. The output of AND gate 43 provides one input of two input AND gate 40, the second input of which will be high due to the output pulse from single shot multivibrator 38. The output of AND gate 40 provides one input to AND gate 37 the second input of which is the 16 megahertz oscillator signal from oscillator circuit 36. AND gate 37 passes the 16 megahertz signal to the clock inputs of counter circuit 42 and counter circuit 45.

As stated above, the clock signal input to counter circuit 42 causes counter circuit 42 to count down at a 16 megahertz rate from the loaded-in value to zero. The time duration of the count down process determines the duration of the output from AND gate 43 and further the number of cycles at 16 megahertz coupled into counter circuit 45. It should be recognized that this process continues for all the detected pulses falling within a gate measurement interval up to a predetermined total number of detected pulses. The resultant signal present in counter circuit 45 is a value representative of the total accumulation of times for the arrivals of the detected pulses.

When a total of thirty-two pulses have been detected within a series of measurement gate intervals, counter circuit 49 will output a signal to single shot multivibrator 48 on the Q5 output line. At the same time the B input of single shot multivibrator 48 will be caused to shift to a low state when the output of AND gate 41 shifts, caused by the completion of the count down process by counter circuit 42 of the thirty-second input pulse. Single shot multivibrator 48 will output a pulse to the enable input of latch circuit 46. The accumulated value signal present in counter circuit 45 will be latched into latch circuit 46. The input to latch circuit 46 is provided by ignoring the five last significant bit outputs of counter circuit 45 resulting in an output signal being held in latch circuit 46 which represents the total accumulation of time of thirty-two input pulses divided by thirty-two or the average time measurement for that predetermined number of pulses. When a new signal is latched in to latch circuit 46 the previous value is cleared and replaced by the new value. Thus, the average time measurement (tm) can be illustrated as follows:

$$tm = (t_1 + t_2 \cdots t_{32})/32.$$

The output of single shot multivibrator 48 also triggers single shot multivibrator 50 one output of which resets counter circuit 49 to zero, the second output of single shot multivibrator 50 will cause counter circuit 45 to clear to zero so that the process can be continuously repeated. The clear signal is also supplied to junction 51 of FIG. 3.

To briefly restate the above process, counter circuit 34 will begin counting up at a one megahertz rate when triggered by the input of the gate interval of FIG. 4B. Whenever a detected pulse is present within a gate measurement interval, illustrated in FIG. 4C, there is provided a load input to counter circuit 42 which causes the then present value within counter circuit 34 to be transferred to counter circuit 42, represented by FIGS. 4E–4H. Counter circuit 42 will then begin to count down from the value loaded-in to zero at a sixteen megahertz rate. The time required to reach zero is transferred to counter circuit 45. This process continues for thirty-two detected pulses at which time the value in counter circuit 45 represents the total accumulation of time for the thirty-two measured pulses. When the thirty-second pulse is processed a value representative of the average time of these thirty-two detected pulses is transferred to latch circuit 46. This value is derived by ignoring the five least significant bit outputs of counter circuit 45 resulting in a divide by thirty-two function. When a new value is loaded into latch circuit 46 the previous value is cleared out, thirty-two pulse counter 49 is reset and counter circuit 45 is cleared so that the process can be continuously repeated.

The preferred embodiment contemplates the clock 36 which is divided down to 1 MHz as the digital time reference for the measurement of average time (tm). The basic frequency of the clock is not critical. Further, in the preferred embodiment counter circuit 34 utilizes three SN74LS293 counters, counter circuit 42 utilizes SN74LS191 counters, and counter circuit 45 utilizes SN74LS293 and latch circuit 46 is a SN74100. All the above devices are available from Texas Instrument, Inc.

Figure 5:
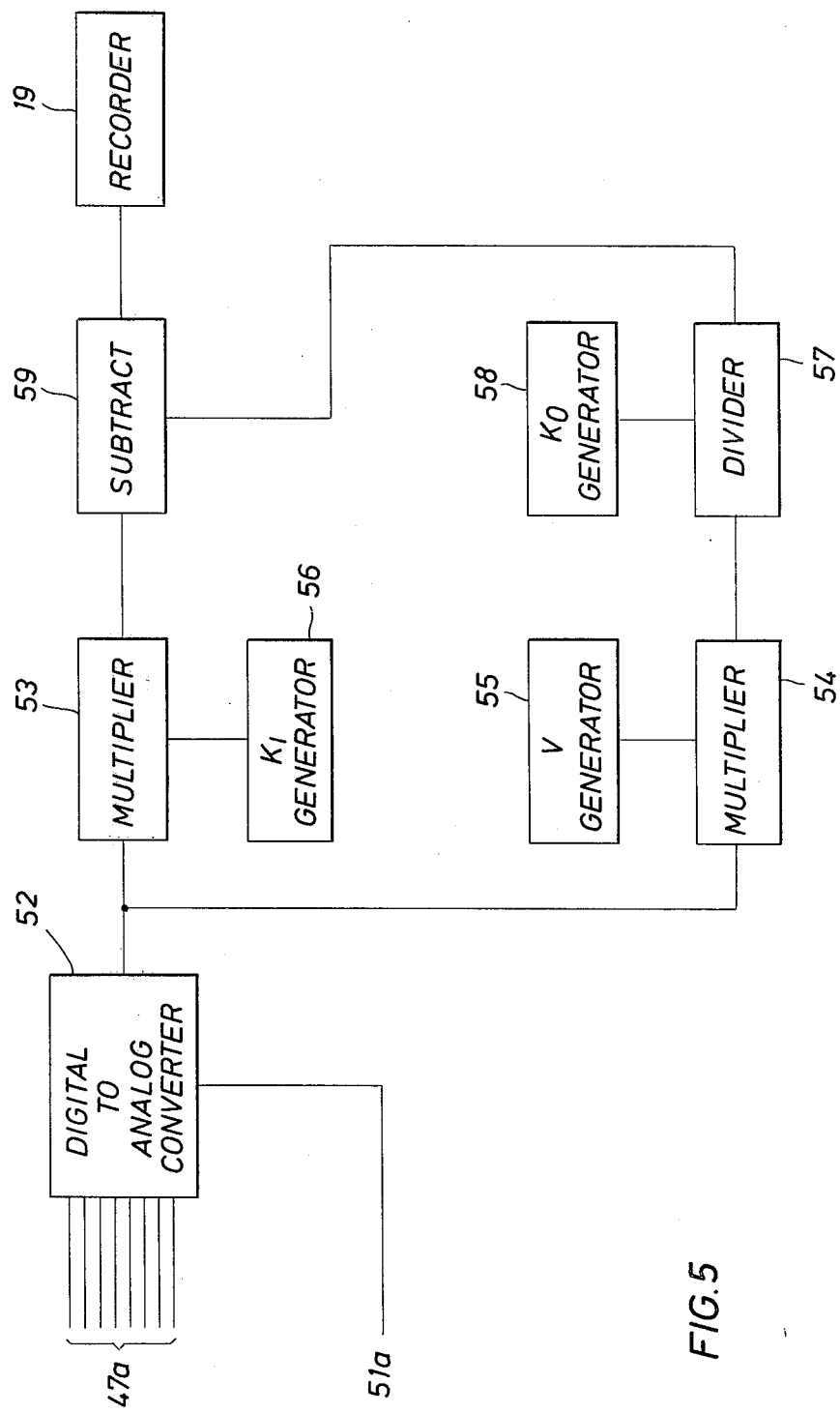
FIG. 5 illustrates in block diagram a further portion of the surface electronics used in accordance with the present invention.

Referring now to FIG. 5, there is shown the circuitry required to convert the average time measurement derived and explained in FIG. 3 to the macroscopic thermal neutron capture cross-section of the formation under investigation. The conductors at junction 47a correspond to conductors shown at junction 47 of FIG. 3 and represent the average time computation for thirty-two detected pulses. This provides the input signal to digital to analog converter circuit 52. Further, junction 51a provides the reset pulse input to digital to analog converter circuit 52. The analog input of digital to analog converter circuit 52 is coupled to the input of multiplier circuit 53 and the input of multiplier circuit 54. Multiplier circuit 54 has a second input from V generator circuit 55 which generates an analog signal indicative of the velocity of thermal neutrons, for example, 2200 meters per second. Multiplier circuit 53 has a second input from $K_1$ generator circuit 56.

The output of multiplier circuit 54 is coupled to divider circuit 57. This output is equal to Vtm. Divider circuit 57 has a second input provided by $K_0$ generator circuit 58 which delivers a preset constant voltage. Thus, the output from divider circuit 57 is indicative of the fraction $K_0/Vtm$.

This output is coupled to one input of subtraction circuit 59. The output of multiplier circuit 53, which is equal to $K_0$tm is coupled to the second input of subtraction circuit 59.

The output of subtraction circuit 59 is an analog voltage equivalent to $K_0/V_{tm} - K_1 tm$.

This analog voltage is substantially equivalent to the macroscopic thermal neutron cross-section of the formation whenever $K_0$ is equal to $3.535714285 \times 10^3$ and $K_1 = 5.357142857 \times 10^{-2}$. This value of Sigma is then recorded on recorder 19 as a function of depth.

Thus, there has been described and illustrated herein a new and improved method and apparatus for measuring thermal neutron decay time. Those skilled in the art will recognize that numerous other variations and modifications may be made without departing from the scope of the present invention. For example, it should be appreciated that skilled in the art can proceed directly to Sigma from an average time measurement based upon derived charts and thus not choose to use the circuitry illustrated in FIG. 5. Furthermore, one could choose not to employ the analog processing circuitry of FIG. 5 but rather process the time measurement by digital apparatus.

The embodiments of the invention in which an exclusive property or privelege is claimed are defined as follows:

1. Apparatus for determining the macroscopic thermal neutron capture cross-section of earth substances, comprising:
   means for irradiating said substances with time-spaced bursts of neutrons;
   means for detecting radiations occasioned in said irradiated substances by said bursts of neutrons during a preselected time interval following each burst of neutrons;
   means for generating electrical pulses indicative of said detected radiation;
   circuit means for determining the time relationship of each of said electrical pulses with respect to the start of said preselected time interval;
   circuit means for accumulating the time relationships of a predetermined number of said electrical pulses and generating a signal representative of the average time relationship of said predetermined number of electrical pulses; and
   circuit means for computing the macroscopic thermal neutron capture cross-section from said average time relationship of said predetermined number of electrical pulses.

2. The apparatus for determining the macroscopic thermal neutron capture cross-section of claim 1, wherein said preselected time interval is 600 microseconds in duration.

3. The apparatus for determining the macroscopic thermal neutron capture cross-section of claim 2, wherein said preselected time interval begins 400 microseconds following each burst of neutrons.

4. The apparatus for determining the macroscopic thermal neutron capture cross-section of claim 3, wherein said bursts of neutrons occurs every 1100 microseconds.

5. The apparatus for determining the macroscopic thermal neutron capture cross-section of claim 1, wherein said circuit means for determining the time relationship of each of said electrical pulses comprises:
   first counter means for counting from the start of said time interval until the arrival of each of said electrical pulses; and
   second counter means for counting from the arrival of each of said electrical pulses to a zero time value.

6. The apparatus for determining the macroscopic thermal neutron capture cross-section of claim 1, wherein said predetermined number of electrical pulses is equal to thirty-two.

7. A method of well logging, comprising:
   pulsedly irradiating the formations surrounding a well with repetitive discrete bursts of high energy neutrons;
   detecting radiation occurring in said well resulting from each bursts of neutrons;
   generating time-separated electrical pulses indicative of said detected radiation;
   generating a plurality of electrical signals, each of said signals being representative of the average time of a predetermined number of said time-separated electrical pulses.

8. Apparatus for determining the average time relationship of a predetermined number of radiation pulses within a radiation detection interval, comprising:
   first counter means for generating first signals functionally related to the arrival of each of said radiation pulses within said detection interval;
   second counter means for generating second signals functionally related to said first signals, said second signals being generated at an increased repetition rate from said first signals;

third counter means for accumulating a predetermined number of said second signals and generating an output signal, said output signal being functionally related to the average time relationship of a predetermined number of said radiation pulses.

9. The apparatus of claim 8, further comprising means for converting said average time signal to the macroscopic neutron capture cross-section of an earth substance.

10. The apparatus of claim 9, further comprising fourth counter means for resetting said third counter after said predetermined number of electrical pulses are detected.

11. The apparatus of claim 10, wherein said predetermined number of electrical pulses is equal to thirty-two.

* * * * *